United States Patent
Ikushima

(10) Patent No.: US 9,689,593 B2
(45) Date of Patent: Jun. 27, 2017

(54) COMPRESSOR AND OIL AMOUNT MANAGEMENT SYSTEM FOR COMPRESSOR

(71) Applicant: SUMITOMO HEAVY INDUSTRIES, LTD., Shinagawa-ku (JP)

(72) Inventor: Yuki Ikushima, Nishitokyo (JP)

(73) Assignee: SUMITOMO HEAVY INDUSTRIES, LTD., Shinagawa-Ku, Tokyo (JP)

(*) Notice: Subject to any disclaimer, the term of this patent is extended or adjusted under 35 U.S.C. 154(b) by 199 days.

(21) Appl. No.: 14/513,243

(22) Filed: Oct. 14, 2014

(65) Prior Publication Data

US 2015/0101487 A1    Apr. 16, 2015

(30) Foreign Application Priority Data

Oct. 15, 2013  (JP) ................................. 2013-214889

(51) Int. Cl.

| | |
|---|---|
| B01D 49/00 | (2006.01) |
| F25B 31/00 | (2006.01) |
| B01D 46/00 | (2006.01) |
| B01D 45/16 | (2006.01) |
| B01D 45/08 | (2006.01) |
| F25B 9/14 | (2006.01) |
| F25B 49/02 | (2006.01) |

(52) U.S. Cl.
CPC ............ *F25B 31/004* (2013.01); *B01D 45/08* (2013.01); *B01D 45/16* (2013.01); *B01D 46/0005* (2013.01); *B01D 46/0086* (2013.01); *F25B 9/14* (2013.01); *F25B 31/006* (2013.01); *F25B 49/02* (2013.01); *F25B 2500/16* (2013.01); *F25B 2700/03* (2013.01)

(58) Field of Classification Search
CPC  B01D 46/0086; B01D 46/0005; B01D 45/16; B01D 46/0023; B01D 45/08; F25B 31/004; F25B 2500/16; F25B 49/02; F25B 31/006; F25B 2700/03; F25B 9/14
See application file for complete search history.

(56) References Cited

U.S. PATENT DOCUMENTS 1,926,262 A * 9/1933 Campbell .............. B01D 45/08
                                                55/324
3,283,532 A * 11/1966 Kocher ................... F25B 43/02
                                                62/473
5,535,595 A * 7/1996 Manz ................... B01D 5/0081
                                                62/475

(Continued)

FOREIGN PATENT DOCUMENTS

| CN | 1363026 A | 8/2002 |
|---|---|---|
| CN | 201972882 U | 9/2011 |

(Continued)

*Primary Examiner* — Dung H Bui
(74) *Attorney, Agent, or Firm* — Buchanan Ingersoll & Rooney PC

(57) ABSTRACT

A compressor compresses a coolant gas returned from a refrigerator and supplies the coolant gas to the refrigerator. A compression capsule compresses the coolant gas and cools compression heat generated by compressing the coolant gas, using oil. An oil separator separates and stores the oil contained in the coolant gas compressed by the compression capsule. A capsule oil level gauge that measures an oil level in the compression capsule. A separator oil level gauge that measures an oil level in the oil separator.

6 Claims, 5 Drawing Sheets

(56) References Cited

U.S. PATENT DOCUMENTS

| | | | | |
|---|---|---|---|---|
| 5,807,422 | A * | 9/1998 | Grgich | B01D 53/0454 95/10 |
| 6,331,195 | B1 * | 12/2001 | Faust | B01D 45/16 55/396 |
| 6,447,573 | B1 * | 9/2002 | Rake | F16N 29/02 95/10 |
| 6,558,444 | B1 * | 5/2003 | Hunter | B01D 46/003 55/385.1 |
| 6,604,371 | B2 | 8/2003 | Ueno | |
| 7,044,999 | B2 * | 5/2006 | Bankstahl | B23K 7/10 55/426 |
| 8,075,668 | B2 * | 12/2011 | Delmotte | F04B 25/00 417/228 |
| 8,366,883 | B2 * | 2/2013 | Bednarek | B01D 1/221 159/24.1 |
| 8,398,733 | B2 * | 3/2013 | Melikyan | B01D 53/265 55/385.1 |
| 8,641,813 | B2 * | 2/2014 | Gysling | G01F 1/36 73/861.04 |
| 8,709,117 | B2 * | 4/2014 | Maruyama | F25B 43/02 55/385.1 |
| 9,068,769 | B2 * | 6/2015 | Tadano | F25B 43/02 |
| 2002/0088245 | A1 * | 7/2002 | Sauterleute | B01D 45/08 62/402 |
| 2007/0146148 | A1 * | 6/2007 | Kawasaki | B01D 46/0086 340/607 |
| 2007/0183916 | A1 * | 8/2007 | Kim | F04C 29/025 418/55.6 |
| 2008/0011550 | A1 | 1/2008 | Dunn et al. | |
| 2009/0127181 | A1 * | 5/2009 | Staschik | C02F 3/04 210/284 |
| 2009/0158934 | A1 * | 6/2009 | Jang | F24F 13/1406 96/189 |
| 2010/0089071 | A1 * | 4/2010 | Hofmann | B65D 90/34 62/48.1 |
| 2010/0269538 | A1 * | 10/2010 | Suzuki | B01D 46/0031 62/470 |
| 2010/0275779 | A1 * | 11/2010 | Melikyan | B01D 53/265 95/213 |
| 2011/0239667 | A1 | 10/2011 | Won et al. | |
| 2012/0125040 | A1 * | 5/2012 | Matsui | B01D 39/06 62/470 |
| 2012/0234037 | A1 | 9/2012 | Tadano et al. | |
| 2012/0240537 | A1 | 9/2012 | Maruyama | |
| 2013/0318934 | A1 * | 12/2013 | Stutzman | B01D 45/08 55/430 |
| 2015/0152763 | A1 * | 6/2015 | Sugio | B01D 45/08 55/385.3 |
| 2016/0011037 | A1 * | 1/2016 | Sugio | B01D 45/08 96/417 |

FOREIGN PATENT DOCUMENTS

| | | |
|---|---|---|
| CN | 102213474 A | 10/2011 |
| JP | 57-173584 | 10/1982 |
| JP | 04-166685 | 6/1992 |
| JP | 9-72635 A | 3/1997 |
| JP | 2001-124388 A | 5/2001 |
| JP | 2005-024168 | 1/2005 |
| JP | 2008-19857 A | 1/2008 |
| JP | 2011-117626 | 6/2011 |
| JP | 2012-193893 A | 10/2012 |
| JP | 2012-202635 A | 10/2012 |
| KR | 10-2008-0092071 A | 10/2008 |

* cited by examiner

FIG.5

| OIL AMOUNT IN COMPRESSION CAPSULE | OIL AMOUNT IN OIL SEPARATOR | TOTAL OIL AMOUNT | STATE OF CIRCULATION OF OIL |
|---|---|---|---|
| BELOW LOWER LIMIT | BELOW LOWER LIMIT | BELOW LOWER LIMIT | INSUFFICIENT TOTAL AMOUNT |
| BELOW LOWER LIMIT | BEYOND UPPER LIMIT OR WITHIN SEPARATOR OIL AMOUNT RANGE | WITHIN COMPRESSOR OIL AMOUNT RANGE | ADSORBER EXCHANGE SMALL ORIFICE APERTURE ORIFICE CLOGGING |
| WITHIN CAPSULE OIL AMOUNT RANGE | BELOW LOWER LIMIT | BELOW LOWER LIMIT | INSUFFICIENT TOTAL AMOUNT (FLOWING OF OIL INTO ADSORBER) |
| BEYOND UPPER LIMIT | BELOW LOWER LIMIT | WITHIN COMPRESSOR OIL AMOUNT RANGE | LARGE ORIFICE APERTURE |
| BEYOND UPPER LIMIT | BEYOND UPPER LIMIT | BEYOND UPPER LIMIT | LARGE OIL AMOUNT |

COMPRESSOR AND OIL AMOUNT MANAGEMENT SYSTEM FOR COMPRESSOR

RELATED APPLICATION

Priority is claimed to Japanese Patent Application No. 2013-214889, filed Oct. 15, 2013, the entire content of which is incorporated herein by reference.

BACKGROUND OF THE INVENTION

1. Field of the Invention

The present invention relates to a compressor and an oil amount management system for a compressor.

2. Description of the Related Art

Gifford-McMahon (GM) refrigerators, pulse tube refrigerators, Stirling refrigerators, and Solvay refrigerators are capable of cooling a target object to a temperature ranging from about 100 K (Kelvin) (low temperature) to 4 K (extremely low temperature). Such refrigerators are used to cool a superconducting magnet or a detector or used in cryopumps, etc. The refrigerator is provided with a compressor for compressing helium gas used as an operating gas in the refrigerator.

In some compressors, oil is used to cool heat generated by compressing an operating gas or to lubricate the compressor. In these compressors, presence of an appropriate amount of oil is essential for proper operation. For this reason, these compressors need periodical maintenance.

There is proposed a technology of detecting the level of the oil surface (oil level) in the oil separator in the compressor and estimating the amount of oil in the compressor in order to detect shortage of oil in the compressor.

SUMMARY OF THE INVENTION

One embodiments of the present invention address a need to provide a technology capable of estimating the state of circulation of oil circulated in a compressor.

One embodiment that addresses the aforementioned need relates to a compressor that compresses a coolant gas (operating gas) returned from a refrigerator and supplies the coolant gas to the refrigerator. The compressor includes a compression capsule that compresses the coolant gas and cools compression heat generated by compressing the coolant gas, using oil; an oil separator that separates and stores the oil contained in the coolant gas compressed by the compression capsule; a capsule oil level gauge that measures an oil level in the compression capsule; and a separator oil level gauge that measures an oil level in the oil separator.

Another embodiment of the present invention relates to an oil amount management system for a compressor. The system includes: a compressor including: a compression capsule that compresses a coolant gas returned from a refrigerator and cools compression heat generated by compressing the coolant gas, using oil; an oil separator that separates and stores the oil contained in the coolant gas compressed by the compression capsule; a capsule oil level gauge that measures an oil level in the compression capsule; and a separator oil level gauge that measures an oil level in the oil separator, the oil amount management system further including: a determination device that obtains a total amount of oil in the compressor based on the oil level in the compression capsule measured by the capsule oil level gauge and the oil level in the oil separator measured by the separator oil level gauge.

Optional combinations of the aforementioned constituting elements, and implementations of the invention in the form of methods, systems, computer programs, and recording mediums storing computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 shows a circulation state table listing the possible states of circulation of oil in the compressor.

DETAILED DESCRIPTION OF THE INVENTION

Figure 1:
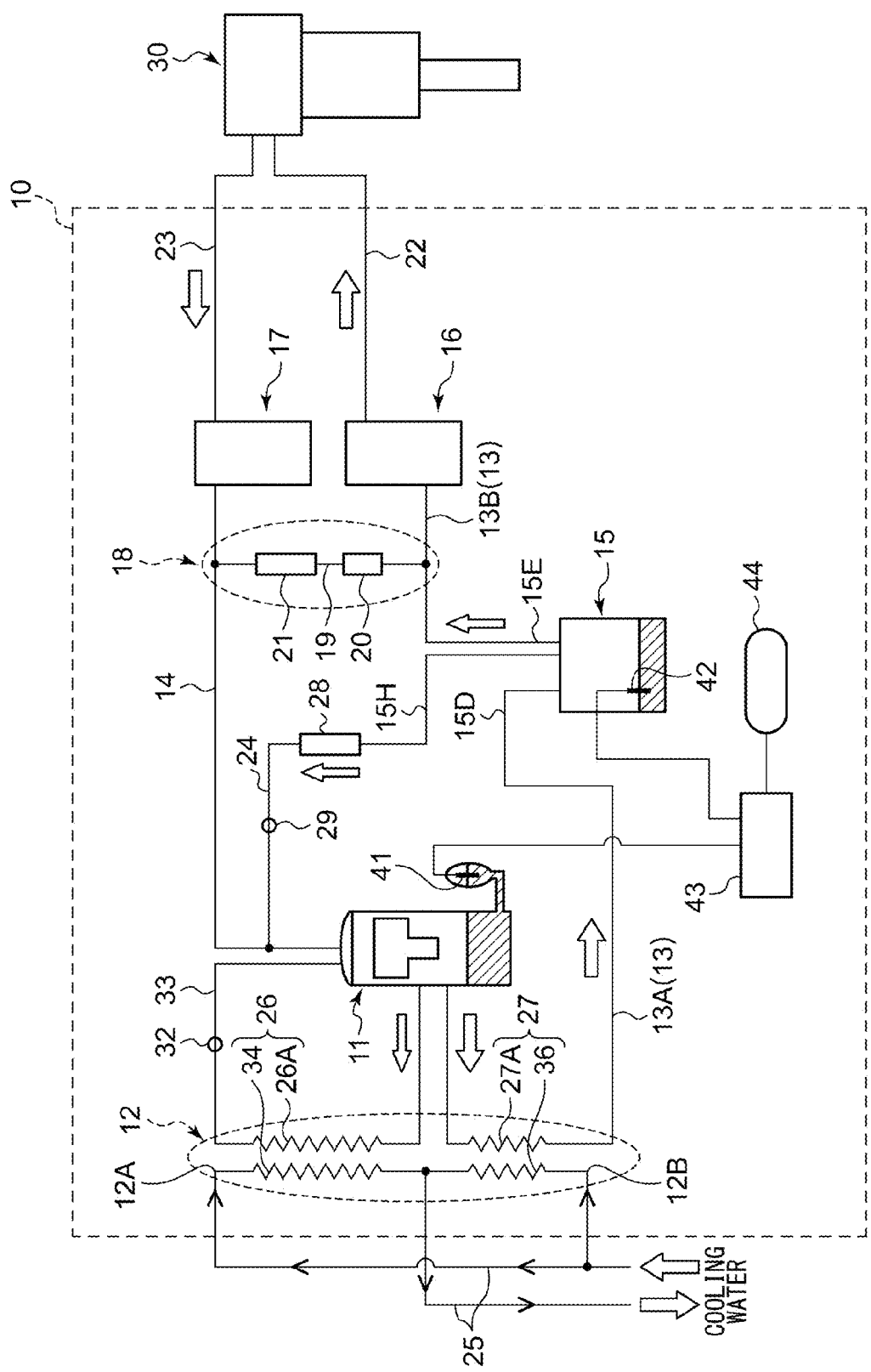
FIG. 1 schematically shows the internal structure of a compressor for a regenerative refrigerator according to the embodiment.

The invention will now be described by reference to the preferred embodiments. This does not intend to limit the scope of the present invention, but to exemplify the invention.

Like numerals in the drawings represent like constituting elements, members or processes so that the description is not repeated. For ease of understanding, the dimension of the members in the drawings may be shown on an enlarged or reduced scale as appropriate. Some of the members not important for the purpose of describing the embodiments are not shown in the drawings.

Generally, the oil in a compressor is circulated not only through the oil separator but between other constituting members in the compressor. For this reason, it is difficult to precisely estimate the state of circulation of oil circulated in the compressor merely by detecting the oil level in one constituting member in the compressor. Accordingly, the compressor according to one embodiment of the present invention is provided with a capsule oil level gauge for measuring the oil level of the oil in the compressor capsule, and a separator oil level gauge for measuring the oil level of the oil in the oil separator.

A description will be given, with reference to FIG. 1, of a compressor for regenerative refrigerators provided with the oil separator according to an embodiment of the present invention. Use of a Gifford-McMahon refrigerator (hereinafter, GM refrigerator) as the regenerative refrigerator will be described in the embodiment by way of example. The GM refrigerator uses helium gas as a coolant gas.

FIG. 1 schematically shows the internal structure of a compressor 10 for the regenerative refrigerator according to the embodiment.

The compressor 10 includes a compression capsule 11, a water-cooled heat exchanger 12, a high pressure pipe 13, a low pressure pipe 14, an oil separator 15, an adsorber 16, a storage tank 17, and a bypass mechanism 18. The compressor 10 is connected to a GM refrigerator 30 by a high pressure flexible pipe 22 and a low pressure flexible pipe 23. The compressor 10 pressurizes low pressure helium gas returned from the GM refrigerator 30 via the low pressure flexible pipe 23 and supplies the gas to the GM refrigerator 30 again via the high pressure flexible pipe 22.

The helium gas returned from the GM refrigerator 30 first flows into the storage tank 17 via the low pressure flexible pipe 23. The storage tank 17 removes pulsation accompanying the returning helium gas. Because the storage tank 17 has a relatively large capacity, the pulsation can be dampened or removed by introducing the helium gas into the storage tank 17.

The helium gas having the pulsation dampened or removed is guided to the low pressure pipe 14. The low pressure pipe 14 is coupled to the compression capsule 11. Therefore, the helium gas having the pulsation dampened or removed in the storage tank 17 is supplied to the compression capsule 11.

The compression capsule 11 is a scroll pump or a rotary pump and compresses and pressurizes the helium gas in the low pressure pipe 14. The compression capsule 11 delivers the helium gas with a raised pressure to the high pressure pipe 13A (13). The helium gas is delivered to the high pressure pipe 13A (13) such that oil in the compression capsule 11 is mixed in the gas in a small amount as the gas is pressurized in the compression capsule 11.

The high pressure pipe 13 corresponds to a coolant gas path in which a coolant gas flows from the compressor 10 to the GM refrigerator 30.

The compression capsule 11 is constructed to cool the gas using oil. Therefore, an oil cooling pipe 33 for circulating oil is coupled to an oil heat exchanger 26 included in the water-cooled heat exchanger 12. Further, an orifice 32 for controlling the flow rate of oil flowing inside is provided in the oil cooling pipe 33.

The water-cooled heat exchanger 12 is constructed to circulate cooling water in a cooling water pipe 25. The water-cooled heat exchanger 12 exchanges heat to discharge heat generated in compressing the helium gas in the compression capsule 11 (hereinafter, referred to as compression heat) outside the compressor 10. The water-cooled heat exchanger 12 is provided with an oil heat exchanger 26 for cooling the oil flowing in the oil cooling pipe 33 and a gas heat exchanger 27 for cooling the pressurized helium gas.

The oil heat exchanger 26 is provided with a part 26A of the oil cooling pipe 33 in which oil flows and a first cooling water pipe 34 in which cooling water flows. The oil heat exchanger 26 is constructed such that heat is exchanged between the part 26A and the first cooling water pipe 34. The oil discharged from the compression capsule 11 to the oil cooling pipe 33 is at a high temperature due to the compression heat. As the high-temperature oil passes through the oil heat exchanger 26, the heat of the oil is transferred to the cooling water by heat exchange so that the temperature of the oil exiting the oil heat exchanger 26 becomes lower than the temperature of the oil entering the oil heat exchanger 26. In other words, the compression heat is transferred to the cooling water via the oil flowing in the oil cooling pipe 33 and discharged outside.

The gas heat exchanger 27 is provided with a part 27A of the high pressure pipe 13A in which high pressure helium gas flows and a second cooling water pipe 36 in which cooling water flows. In the gas heat exchanger 27, as in the oil heat exchanger 26, the compression heat is transferred to the cooling water via the helium gas flowing in the high pressure pipe 13A (13) and discharged outside.

The first cooling water pipe 34 and the second cooling water pipe 36 are coupled in series. An end of the first cooling water pipe 34 functions as a cooling water receiving port 12A of the water-cooled heat exchanger 12. The other end of the first cooling water pipe 34 is coupled to one end of the second cooling water pipe 36. The other end of the second cooling water pipe 36 functions as a cooling water discharge port 12B of the water-cooled heat exchanger 12.

The helium gas pressurized in the compression capsule 11 and cooled by the gas heat exchanger 27 is supplied to the oil separator 15 via the high pressure pipe 13A (13). The oil separator 15 separates oil contained in the helium gas and removes impurities and dust contained in the oil. The oil separated by the oil separator 15 is temporarily stored in the oil separator 15.

The helium gas with oil removed by the oil separator 15 is delivered to the adsorber 16 via the high pressure pipe 13B (13). The adsorber 16 includes, for example, activated carbon and is designed to remove the oil component, and in particular, the gasified oil component contained in the helium gas. Once the gasified oil component is removed in the adsorber 16, the helium gas is guided to the high pressure flexible pipe 22 and supplied thereby to the GM refrigerator 30.

The bypass mechanism 18 is provided with a bypass pipe 19, a high pressure side pressure detector 20, and a bypass valve 21. The bypass pipe 19 communicates the high pressure pipe 13B with the low pressure pipe 14. The high pressure side pressure detector 20 detects the pressure of the helium gas in the high pressure pipe 13B (hereinafter, "high pressure side pressure"). The bypass valve 21 is an electric-powered valve device to open and close the bypass pipe 19. The bypass valve 21 is constructed as a normally closed valve controlled to be driven by the high pressure side pressure detector 20.

More specifically, the bypass valve 21 is constructed to be driven by the high pressure side pressure detector 20 so as to be opened, when the high pressure side pressure detector 20 detects that the pressure of the helium gas in a path between the oil separator 15 and the adsorber 16 is a predefined pressure or higher. This reduces the likelihood that helium gas at a predefined pressure or higher is supplied to the GM refrigerator 30.

The high pressure side of an oil return pipe 24 is coupled to the oil separator 15 and the low pressure side thereof is coupled to the low pressure pipe 14. In the middle of the oil return pipe 24 are provided a filter 28 for removing dust contained in the oil filtered by the oil separator 15 and an orifice 29 for controlling the amount of oil returned.

Thus, part of the oil used in the compression capsule 11 is transferred to the oil separator 15 via the high pressure pipe 13A(13) and is returned to the compression capsule 11 again via the oil return pipe 24. In other words, the oil used in the compression capsule 11 is circulated in a circulation path that runs through the compression capsule 11, the high pressure pipe 13A(13), the oil separator 15, and the oil return pipe 24 in the compressor 10. Further, part of the oil flowing through the circulation path is removed by the adsorber 16 and discharged outside the circulation path.

A capsule oil level gauge 41 for measuring the oil level in the compression capsule 11 is mounted in the compression capsule 11. A separator oil level gauge 42 for measuring the oil level in the oil separator 15 is mounted in the oil separator 15.

The oil level in the compression capsule 11 measured by the capsule oil level gauge 41 is transmitted to a determination device 43. Further, the oil level in the oil separator 15 measured by the separator oil level gauge 42 is also transmitted to the determination device 43. The determination device 43 determines the state of circulation of oil in the compressor 10 based on the oil level in the compression capsule 11 and the oil level in the oil separator 15.

The term "the state of circulation of oil" means the amount of oil in different parts of the aforementioned circulation path in the compressor 10 or the balance in the amount of oil. Specific examples of the state of circulation of oil will be described along with the functional features of the determination device 43.

Figure 2:
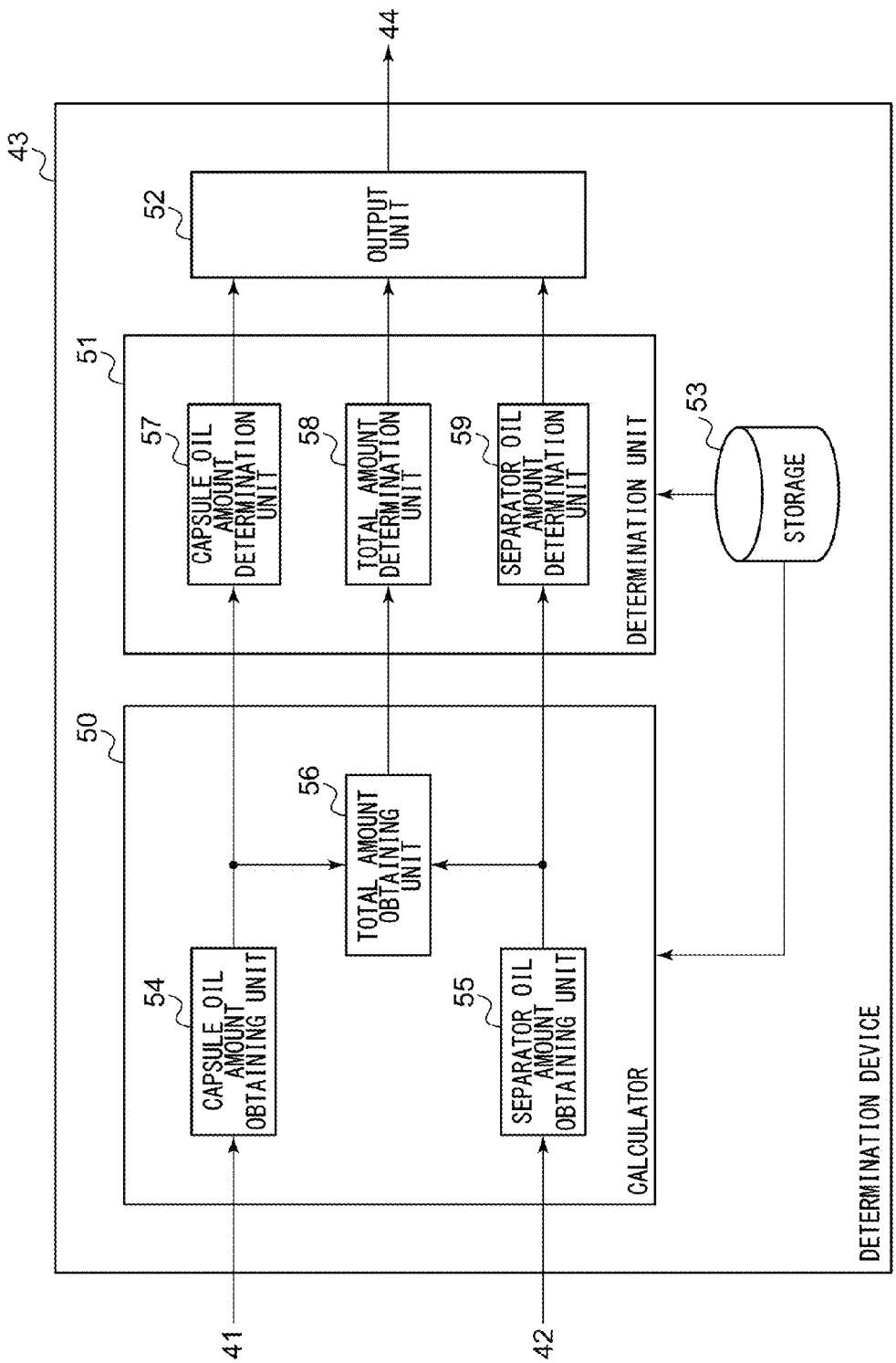
FIG. 2 shows the functional features of the determination device according to the embodiment.

FIG. 2 shows the functional features of the determination device 43 according to the embodiment. The determination device 43 is provided with a calculator 50, a determination unit 51, an output unit 52, and a storage 53.

FIG. 2 shows the functional features to implement the determination device 43 and the other features are omitted from the illustration. The elements depicted in FIG. 2 as functional blocks for performing various processes are implemented by hardware such as a CPU, a main memory, or other LSI's, and by software such as a programs etc., loaded into the main memory. Therefore, it will be obvious to those skilled in the art that the functional blocks may be implemented in a variety of manners by hardware only, software only, or a combination of thereof.

The calculator 50 calculates the amount of oil in the compression capsule 11 from the oil level in the compression capsule 11 obtained from the capsule oil level gauge 41, and calculates the amount of oil in the oil separator 15 from the oil level in the oil separator 15 obtained from the separator oil level gauge 42. For this purpose, the calculator 50 is provided with a capsule oil amount obtaining unit 54, a separator oil amount obtaining unit 55, and a total amount obtaining unit 56.

The oil in the compression capsule 11 is used to lubricate and cool the compression capsule 11 and is located toward the bottom of the compression capsule 11. The cross-sectional area of the compression capsule 11 toward the bottom may not necessarily be uniform and differ depending on the height. A driver member for compressing the helium gas is provided in the compression capsule 11. For this reason, the oil level in the compression capsule 11 is not necessarily proportional to the amount of oil in the compression capsule 11.

Therefore, the storage 53 stores a capsule oil level table that maps the oil level in the compression capsule 11 to the amount of oil therein. When the capsule oil amount obtaining unit 54 obtains the oil level in the compression capsule 11 from the capsule oil level gauge 41, the capsule oil amount obtaining unit 54 refers to the capsule oil amount table stored in the storage 53 and calculates and obtains the amount of oil in the compression capsule 11. The capsule oil amount table may be prepared by actually filling oil in the compression capsule 11 and measuring the amount of oil filled and the concurrent oil level.

The oil separated from the helium gas in the oil separator 15 is stored at the bottom of the oil separator 15 and is returned to the compression capsule 11 again via the oil return pipe 24. Like the cross-sectional area of the compression capsule 11 toward the bottom, the cross-sectional area of the oil separator 15 toward the bottom may not necessarily be uniform and differ depending on the height. A filter etc. for removing impurities and dust contained in the oil is provided in the oil separator 15. For this reason, the oil level in the oil separator 15 is not necessarily proportional to the amount of oil in the oil separator 15.

Therefore, the storage 53 stores a separator oil amount table that maps the oil level in the oil separator 15 to the amount of oil therein. When the separator oil amount obtaining unit 55 obtains the oil level in the oil separator 15 from the separator oil level gauge 42, the separator oil amount obtaining unit 55 refers to the separator oil amount table stored in the storage 53 and calculates and obtains the amount of oil in the oil separator 15. Like the capsule oil amount table, the separator oil amount table may be prepared by actually filling oil in the oil separator 15 and measuring the amount of oil filled and the concurrent oil level.

The total amount obtaining unit 56 obtains the total amount of oil in the compressor 10 based on the amount of oil in the compression capsule 11 obtained by the capsule oil amount obtaining unit 54 and the amount of oil in the oil separator 15 obtained by the separator oil amount obtaining unit 55. The oil circulated in the compressor 10 could be located not only in the compression capsule 11 and the oil separator 15 but also in the high pressure pipe 13A (13) and the oil return pipe 24. Accordingly, the total amount obtaining unit 56 obtains the total amount of oil in the compressor 10 by adding, as a correction amount, the amount of oil that could be located in the high pressure pipe 13A (13) and the oil return pipe 24 to the amount of oil in the compression capsule 11 and the amount of oil in the oil separator 15. The correction amount is stored in the storage 53.

If the amount of oil that could be located in the high pressure pipe 13A (13) and the oil return pipe 24 is sufficiently smaller than the total of the amount of oil in the compression capsule 11 and the amount of oil in the oil separator 15, the total amount obtaining unit 56 may calculate the total of the amount of oil in the compression capsule 11 and the amount of oil in the oil separator 15 and define the total as the total amount of oil in the compressor 10. In this case, the correction amount is 0. In either case, the correction amount used in obtaining the total amount of oil in the compressor 10 may be determined by considering the diameter, length, etc. of the high pressure pipe 13A (13) and the oil return pipe 24. Alternatively, the amount of oil that could be located in the high pressure pipe 13A (13) and the oil return pipe 24 may be assumed to be constant.

The determination unit 51 determines the state of circulation of oil in the compressor 10 based on the result of calculation by the calculator 50. For this purpose, the determination unit 51 is provided with a capsule oil amount determination unit 57, a total amount determination unit 58, and a separator oil amount determination unit 59.

As described above, the oil in the compression capsule 11 is used to cool and lubricate the compression capsule 11. Therefore, if the compression capsule 11 runs short of oil, the operation of the compressor 10 may suffer. Meanwhile, the oil in the compressor 10 is decreased with time as it is circulated through the circulation path in the compressor 10 due to, for example, adsorption by the adsorber 16. For this reason, the total amount of oil in the compressor 10 provides a clue to know the timing of maintenance of the compressor 10 (e.g., supply of oil). Thus, the total amount of oil in the compressor 10 is one indicator to gauge the state of circulation of oil in the compressor 10.

Accordingly, the total amount determination unit 58 determines whether the total amount of oil obtained by the total amount obtaining unit 56 is found within a compressor oil amount range defined as the amount of oil that should be in the compressor 10.

The term "compressor oil amount range" means a range between a "compressor lower limit oil amount" defined as the lower limit of the amount of oil that should be in the compressor 10 and a "compressor upper limit oil amount" defined as the upper limit of the amount of oil that should be in the compressor 10. The compressor lower limit oil amount and the compressor upper limit oil amount may be determined by considering the size and performance of the compression capsule 11, the size of the oil separator 15, etc. The compressor lower limit oil amount and the compressor upper limit oil amount are stored in the storage 53.

The total amount determination unit 58 reads the compressor lower limit oil amount and the compressor upper limit oil amount from the storage 53 and determines that the total amount of oil is within the compressor oil amount range if the total amount of oil obtained by the total amount obtaining unit 56 is between the compressor lower limit oil amount and the compressor upper limit oil amount, both inclusive.

If the total amount determination unit 58 determines that the total amount of oil is outside the compressor oil amount range, the output unit 52 outputs an associated alert to a notification unit 44. More specifically, if the total amount of oil is less than the compressor lower limit oil amount or beyond the compressor upper limit oil amount, the output unit 52 outputs an associated alert to the notification unit 44.

The notification unit 44 brings the information obtained from the output unit 52 to the user's attention. The notification unit 44 is provided with a light emitting diode (LED), a liquid crystal display etc. (not shown) and lights the LED or displays an alert on the liquid display if the total amount of oil is outside the compressor oil amount range. This allows the user to know that there is too much or too little oil in the compressor 10 and run maintenance appropriately.

The notification unit 44 may be provided with a speaker or a beep source in place of or in addition to the LED or the liquid crystal display and give information to the user using sound. Alternatively, the notification unit 44 may give information to the user by means such as electronic mail via a network (not shown).

Figure 3:
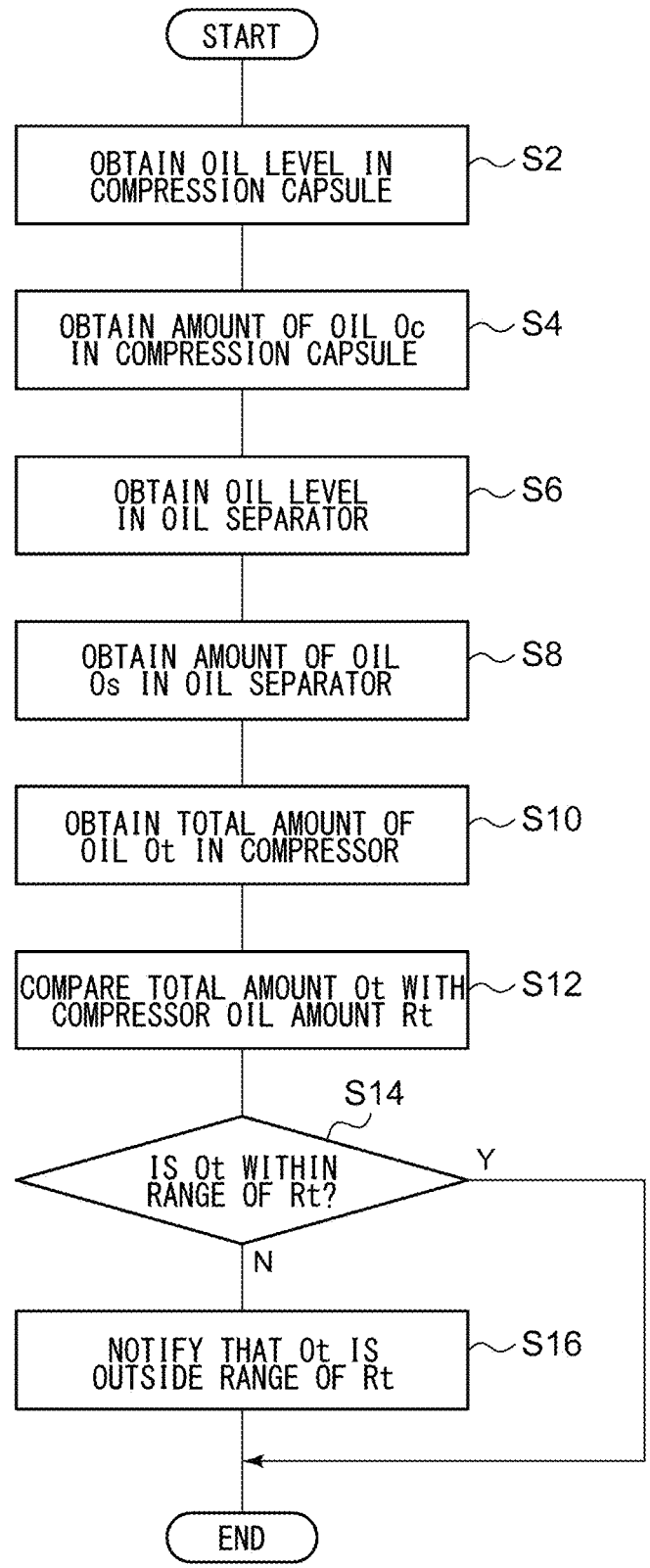
FIG. 3 is a flowchart illustrating the flow of the total amount determination process executed by the determination device according to the embodiment.

FIG. 3 is a flowchart illustrating the flow of the total amount determination process executed by the determination device 43 according to the embodiment. For example, the process of the flowchart is started when the power of the determination device 43 is turned on.

The capsule oil amount obtaining unit 54 obtains the oil level in the compression capsule 11 from the capsule oil level gauge 41 (S2). The capsule oil amount obtaining unit 54 refers to the capsule oil amount table read from the storage 53 and obtains the amount of oil Oc in the compression capsule 11 based on the oil level in the compression capsule 11 (S4).

The separator oil amount obtaining unit 55 obtains the oil level in the oil separator 15 from the separator oil level gauge 42 (S6). The separator oil amount obtaining unit 55 refers to the separator oil amount table read from the storage 53 and obtains the amount of oil Os in the oil separator 15 based on the oil level in the oil separator 15 (S8).

The total amount obtaining unit 56 adds the correction amount of oil to the total of the amount of oil Oc in the compression capsule 11 and the amount of oil Os in the oil separator 15 so as to obtain the total amount Ot of oil in the compressor 10 (S10).

The total amount determination unit 58 compares the total amount of oil Ot in the compressor 10 obtained by the total amount obtaining unit 56 with the compressor oil amount range Rt (S12). If the total amount of oil Ot in the compressor 10 is outside the compressor oil amount range Rt (N in S14), the notification unit 44 notifies the user accordingly (S16).

If the notification unit 44 gives information to the user or if the total amount of oil Ot in the compressor 10 is within the compressor oil amount range Rt (Y in S14), the process of the flowchart is terminated.

As described above, the compressor 10 according to the embodiment is provided with the capsule oil level gauge 41 for measuring the oil level in the compression capsule 11 and the separator oil level gauge 42 for measuring the oil level in the oil separator 15. It is therefore possible to obtain both the amount of oil in the compression capsule 11 and the amount of oil in the oil separator 15, as contrasted with the case where only one of the oil level gauges is provided. Thus, the total amount of oil available in the compressor 10 as a whole can be obtained. This allows determination of the state of circulation of oil in the compressor 10 (e.g., oil shortage, etc. in the compressor 10 as a whole).

The indicator indicating the state of circulation of oil in the compressor 10 is not necessarily the total amount of oil in the compressor 10. A description will be given below of indicators indicating the state of circulation other than the total amount of oil.

As described above, the oil used in the compression capsule 11 is circulated in a circulation path that runs through the compression capsule 11, the high pressure pipe 13A(13), the oil separator 15, and the oil return pipe 24 in the compressor 10. Therefore, even if the total amount of oil in the compressor 10 is within the compressor oil amount range, the operation of the compression capsule 11 may suffer if the amount of oil in the compression capsule 11 is small. This may be caused by a small aperture of the orifice 29 provided in the oil return pipe 24 or clogging of the orifice 29 by foreign materials.

Thus, the capsule oil amount determination unit 57 determines whether the amount of oil obtained by the capsule oil amount obtaining unit 54 is included in the capsule oil amount range defined as the amount of oil that should be in the compression capsule 11.

The term "capsule oil amount range" means a range between a "capsule lower limit oil amount" defined as the lower limit of the amount of oil that should be in the compression capsule 11 and a "capsule upper limit oil amount" defined as the upper limit of the amount of oil that should be in the compression capsule 11. The capsule lower limit oil amount and the capsule upper limit oil amount may be determined by considering the size, performance, etc. of the compression capsule 11. The capsule lower limit oil amount and the capsule upper limit oil amount are stored in the storage 53.

The capsule oil amount determination unit 57 reads the capsule lower limit oil amount and the capsule upper limit oil amount from the storage 53 and determines that the amount of oil in the compression capsule 11 is within the capsule oil amount range if the total amount of oil obtained by the capsule oil amount obtaining unit 54 is between the capsule lower limit oil amount and the capsule upper limit oil amount, both inclusive.

Like the capsule oil amount determination unit 57, the separator oil amount determination unit 59 determines whether the amount of oil obtained by the separator oil amount obtaining unit 55 is included in the separator oil amount range defined as the amount of oil that should be in the oil separator 15.

The term "separator oil amount range" means a range between a "separator lower limit oil amount" defined as the lower limit of the amount of oil that should be in the oil separator 15 and a "separator upper limit oil amount" defined as the upper limit of the amount of oil that should be in the oil separator 15. The separator lower limit oil amount and the separator upper limit oil amount may be determined by considering the size, performance, etc. of the oil separator 15. The separator lower limit oil amount and the separator upper limit oil amount are stored in the storage 53.

The separator oil amount determination unit 59 reads the separator lower limit oil amount and the separator upper limit oil amount from the storage 53 and determines that the amount of oil in the oil separator 15 is within the separator oil amount range if the total amount of oil obtained by the separator oil amount obtaining unit 55 is between the separator lower limit oil amount and the separator upper limit oil amount, both inclusive.

If the capsule oil amount determination unit 57 determines that the amount of oil in the compression capsule 11 is outside the capsule oil amount range, the output unit 52 outputs an associated alert to the notification unit 44. More specifically, if the amount of oil in the compression capsule 11 is less than the capsule lower limit oil amount or beyond the capsule upper limit oil amount, the output unit 52 outputs an associated alert to the notification unit 44.

Similarly, if the separator oil amount determination unit 59 determines that the amount of oil in the oil separator 15 is outside the separator oil amount range, the output unit 52 outputs an associated alert to the notification unit 44. More specifically, if the amount of oil in the oil separator 15 is less than the separator lower limit oil amount or beyond the separator upper limit oil amount, the output unit 52 outputs an associated alert to the notification unit 44.

Figure 4:
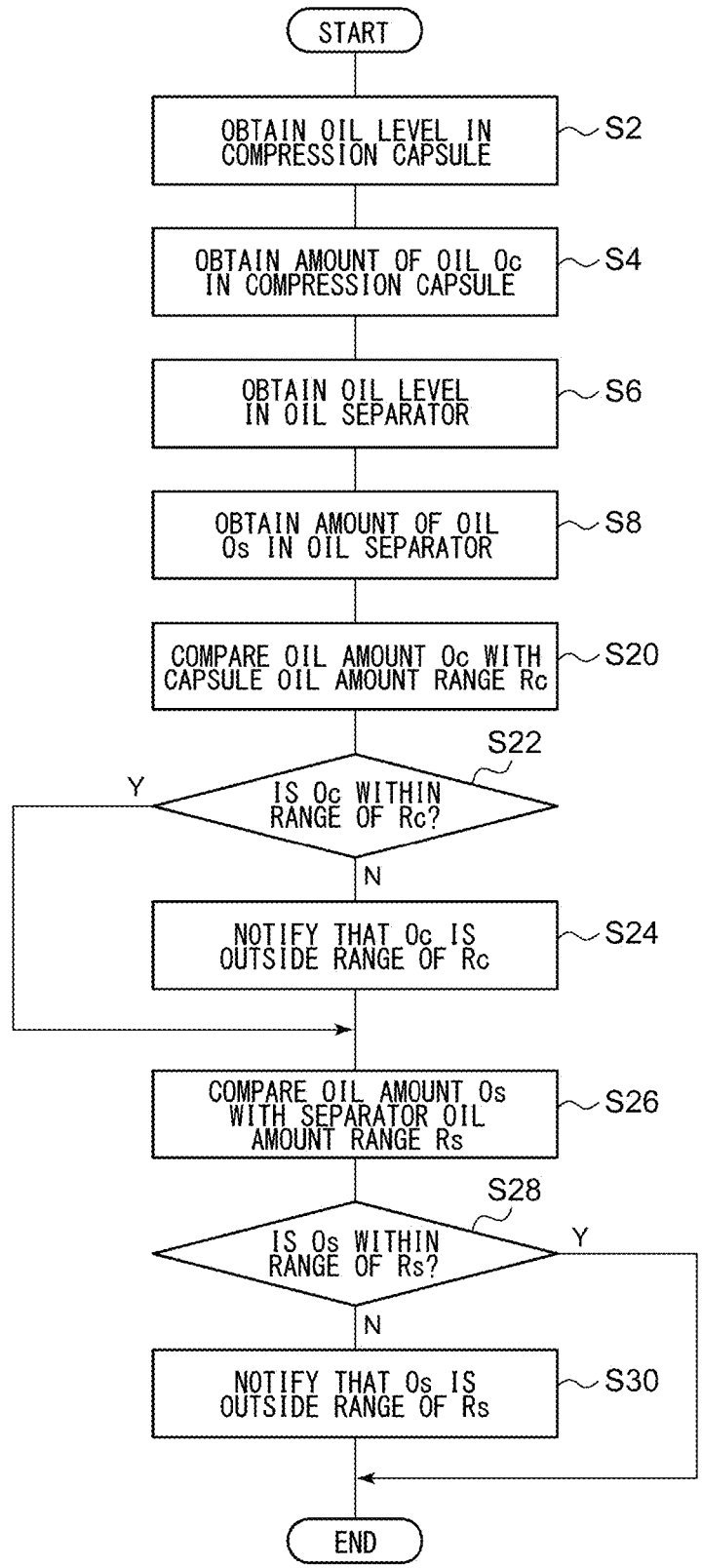
FIG. 4 is a flowchart illustrating the flow of the capsule oil amount determination process and the separator oil amount determination process executed by the determination device according to the embodiment.

FIG. 4 is a flowchart illustrating the flow of the capsule oil amount determination process and the separator oil amount determination process executed by the determination device 43 according to the embodiment. For example, the process of the flowchart is started when the power of the determination device 43 is turned on. The first four steps (step S2 thorough step S8) in FIG. 4 are identical to those of FIG. 3 so that a description will be omitted.

The capsule oil amount determination unit 57 compares the amount of oil Oc in the compression capsule 11 obtained by the capsule oil amount obtaining unit 54 with the capsule oil amount range Rc (S20). If the amount of oil Oc in the compression capsule 11 is outside the capsule oil amount range Rc (N in S22), the notification unit 44 notifies the user accordingly (S24). If the amount of oil Oc in the compression capsule 11 is within the capsule oil amount range Rc (Y in S22), no specific steps are performed.

The separator oil amount determination unit 59 compares the amount of oil Os in the oil separator 15 obtained by the separator oil amount obtaining unit 55 with the separator oil amount range Rs (S26). If the amount of oil Os in the oil separator 15 is outside the separator oil amount range Rs (N in S28), the notification unit 44 notifies the user accordingly (S30).

If the amount of oil Os in the oil separator 15 is within the separator oil amount range Rs (Y in S28) or if the notification unit 44 notifies the user that the amount of oil Os in the oil separator 15 is outside the separator oil amount range Rs, the process in the flowchart is terminated.

Thus, the user can not only know the total amount of oil in the compressor 10 but also know the amount of oil in the compression capsule 11 and the amount of oil in the oil separator 15 individually. This allows the user to know the balance between the amounts of oil in the compressor 10 as an indicator of the state of circulation of oil in the circulation path in the compressor 10. For example, even if the total amount of oil in the compressor 10 is within the compressor oil amount range, the oil is located in a disproportionately large amount in the compression capsule 11 if the amount of oil in the compression capsule 11 is beyond the capsule oil amount range and the amount of oil in the oil separator 15 is below the separator oil amount range, This may be because the aperture of the orifice 29 provided in the oil return pipe 24 is too large.

FIG. 5 shows a circulation state table listing the possible states of circulation of oil in the compressor 10. As shown in FIG. 5, if the total amount of oil in the compressor 10 is at the lower limit of the compressor oil amount range or below and if the amount of oil in the oil separator 15 is at the lower limit of the separator oil amount range or below, the total amount of oil in the compressor 10 will be at the lower limit of the compressor oil amount range or below. Such a state may be induced by insufficient total amount of oil filled in the compressor 10 at the time of maintenance. Alternatively, the oil in the compressor 10 may have been reduced for some reason.

For example, even if the total amount of oil in the compressor 10 is within the compressor oil amount range, the oil is located in a disproportionately large amount in the oil separator 15 if the amount of oil in the compression capsule 11 is at the lower limit of the capsule oil amount range or below and the amount of oil in the oil separator 15 is within the separator oil amount range, or is equal to or more than the upper limit thereof. This may indicate that the aperture of the orifice 29 provided in the oil return pipe 24 is small. Alternatively, this may indicate clogging of the orifice 29 and difficulty of the oil to flow therethrough.

Even if the amount of oil in the compression capsule 11 is within the capsule oil amount range, insufficiency of the oil in the compressor 10 is indicated if the amount of oil in the oil separator 15 is at the lower limit of the separator oil amount range or below and if the total amount of oil in the compressor 10 is at the lower limit of the compressor oil amount range or below. This indicates that the oil flows into the adsorber 16 and so indicates that the adsorber 16 should be maintained or, if necessary, exchanged.

If the amount of oil in the compression capsule 11 is beyond the capsule oil amount range, and if the amount of oil in the oil separator 15 is beyond the upper limit of the separator oil amount range, the total amount of oil in the compressor 10 will be beyond the upper limit of the compressor oil amount range. This indicates that the amount of oil in the compressor 10 is too much. This state does not affect the operation of the compressor 10 immediately but indicates that the amount of oil should be reduced because the excess may cause oil leakage etc.

Thus, according to the compressor 10 of the embodiment, the amount of oil in the compression capsule 11 in the compressor 10 and the amount of oil in the oil separator 15 can be obtained individually so that the state of circulation of oil in the compressor 10 can be obtained in details as shown in FIG. 5.

Associated with this, the storage 53 stores the circulation state table shown in FIG. 5 that maps the states of circulation of oil in the compressor 10 to the amount of oil in the compression capsule 11, the amount of oil in the oil separator 15, and the total amount of oil in the compressor 10. The output unit 52 obtains the amount of oil in the compression capsule 11, the amount of oil in the oil separator 15, and the total amount of oil in the compressor 10 from the capsule oil amount determination unit 57, the separator oil amount determination unit 59, and the total amount determination unit 58, respectively. The output unit 52 may refer to the circulation state table read from the storage 53, using these amounts of oil thus obtained as keys and communicate the state of circulation of oil in the compressor 10 to the notification unit 44. This allows the user to know the state of circulation of oil in the compressor 10 and know the details and timing of maintenance of the compressor 10.

As described above, the according to the compressor 10 of the embodiment, the state of circulation of oil circulated in the compressor can be estimated properly.

In particular, the total amount of oil circulated in the compressor can be obtained precisely by obtaining the amount of oil in the compression capsule 11 in the compressor 10 and the amount of oil in the oil separator 15 individually. By obtaining the amount of oil in the compression capsule 11 and the amount of oil in the oil separator 15 individually, imbalance in the amount of oil within the compressor 10 can be known so that information on maintenance (e.g., clogging of the pipe or orifice) can also be obtained. Further, by examining the time-dependent change in the amount of oil in the compression capsule 11 and the amount of oil in the oil separator 15, it is possible to diagnose whether the oil is properly circulated in the compressor.

Described above is an explanation based on an exemplary embodiment. The embodiment is intended to be illustrative only and it will be obvious to those skilled in the art that various modifications to constituting elements and processes could be developed and that such modifications are also within the scope of the present invention.

It should be understood that the invention is not limited to the above-described embodiment, but may be modified into various forms on the basis of the spirit of the invention. Additionally, the modifications are included in the scope of the invention.

What is claimed is:

1. A compressor that compresses a coolant gas comprising: at least one refrigerator pipe that connects to a refrigerator and through which the coolant gas is supplied to or returned from the refrigerator; a compression capsule that compresses the coolant gas and cools compression heat generated by compressing the coolant gas, using oil; an oil separator that separates and stores the oil contained in the coolant gas compressed by the compression capsule; an oil return pipe that returns the oil stored in the oil separator to the compression capsule, a determination device comprising a calculator that calculates an indicator indicating an amount of oil in the compressor and a determination unit that determines a state of circulation of oil in the compressor based on the calculated indicator; a capsule oil level gauge that measures an oil level in the compression capsule and transmits the measured oil level in the compression capsule to the calculator; and a separator oil level gauge that measures an oil level in the oil separator and transmits the measured oil level in the oil separator to the calculator, wherein the calculator calculates the indicator based on the oil level in the compression capsule measured and transmitted by the capsule oil level gauge and the oil level in the oil separator measured and transmitted by the separator oil level gauge, and wherein the determination device comprises: a storage that stores a capsule oil level table that maps the oil level in the compression capsule to an amount of oil in the compression capsule and a separator oil amount table that maps the oil level in the oil separator to an amount of oil in the oil separator, and a hardware processor configured to: control a capsule oil amount obtaining unit to obtain the measured oil level in the compression capsule from the capsule oil level gauge, refer to the capsule oil level table stored in the storage, and obtain an amount of oil in the compression capsule based on the measured oil level in the compression capsule and the capsule oil amount table; control a separator oil amount obtaining unit to obtain the measured oil level in the oil separator from the separator oil level gauge, refer to the separator oil amount table stored in the storage, and obtain an amount of oil in the oil separator based on the measured oil level in the oil separator and the separator oil amount table; and control a total amount obtaining unit to obtain a total amount of oil in the compressor based on the amount of oil in the compression capsule obtained by the capsule oil amount obtaining unit and the amount of oil in the oil separator obtained by the separator oil amount obtaining unit.

2. The compressor according to claim 1, wherein the determination unit includes a total amount determination unit that is controlled by the hardware processor to determine whether the total amount of oil obtained by the total amount obtaining unit is included in a compressor oil amount range defined as the amount of oil that should be in the compressor.

3. The compressor according to claim 2, wherein the hardware processor is configured to notify a notification unit if the total amount of oil obtained by the total amount obtaining unit is outside the compression oil amount range.

4. The compressor according to claim 1, wherein the determination unit includes:
a capsule oil amount determination unit that is controlled by the hardware processor to determine whether the oil amount obtained by the capsule oil amount obtaining unit is included in a capsule oil amount range defined as the amount of oil that should be in the compression capsule; and
a separator oil amount determination unit that is controlled by the hardware processor to determine whether the amount of oil obtained by the separator oil amount obtaining unit is included in a separator oil amount range defined as the amount of oil that should be stored in the oil separator.

5. The compressor according to claim 4, wherein the hardware processor is configured to notify a notification unit if the amount of oil obtained by the capsule oil amount obtaining unit is outside the capsule oil amount range or if the amount of oil obtained by the separator oil amount obtaining unit is outside the separator oil amount range.

6. A compressor oil amount management system, comprising:
a refrigerator; and
a compressor oil circulation path including:
a compression capsule that compresses a coolant gas returned from the refrigerator and cools compression heat generated by compressing the coolant gas, using oil;
an oil separator that separates and stores the oil contained in the coolant gas compressed by the compression capsule;
a determination device comprising a calculator that calculates a total amount of oil in the compressor oil circulation path;
a capsule oil level gauge that measures an oil level in the compression capsule and transmits the measured oil level in the compression capsule to the calculator for calculation of the total amount of oil in the compressor oil circulation path; and
a separator oil level gauge that measures an oil level in the oil separator and transmits the measured oil level in the oil separator to the calculator for the calculation of the total amount of oil in the compressor oil circulation path, wherein wherein the determination device comprises:

a storage that stores a capsule oil level table that maps the oil level in the compression capsule to an amount of oil in the compression capsule and a separator oil amount table that maps the oil level in the oil separator to an amount of oil in the oil separator, and a hardware processor configured to:

control a capsule oil amount obtaining unit to obtain the measured oil level in the compression capsule from the capsule oil level gauge, refer to the capsule oil level table stored in the storage, and obtain an amount of oil in the compression capsule based on the measured oil level in the compression capsule and the capsule oil amount table;

control a separator oil amount obtaining unit to obtain the measured oil level in the oil separator from the separator oil level gauge, refer to the separator oil amount table stored in the storage, and obtain an amount of oil in the oil separator based on the measured oil level in the oil separator and the separator oil amount table; and control a total amount obtaining unit to obtain a total amount of oil in the compressor based on the amount of oil in the compression capsule obtained by the capsule oil amount obtaining unit and the amount of oil in the oil separator obtained by the separator oil amount obtaining unit.

* * * * *